Nov. 29, 1960    L. M. DUNN ET AL    2,961,885
MULTIPLE SPEED TRANSMISSION
Filed July 6, 1959    2 Sheets-Sheet 1
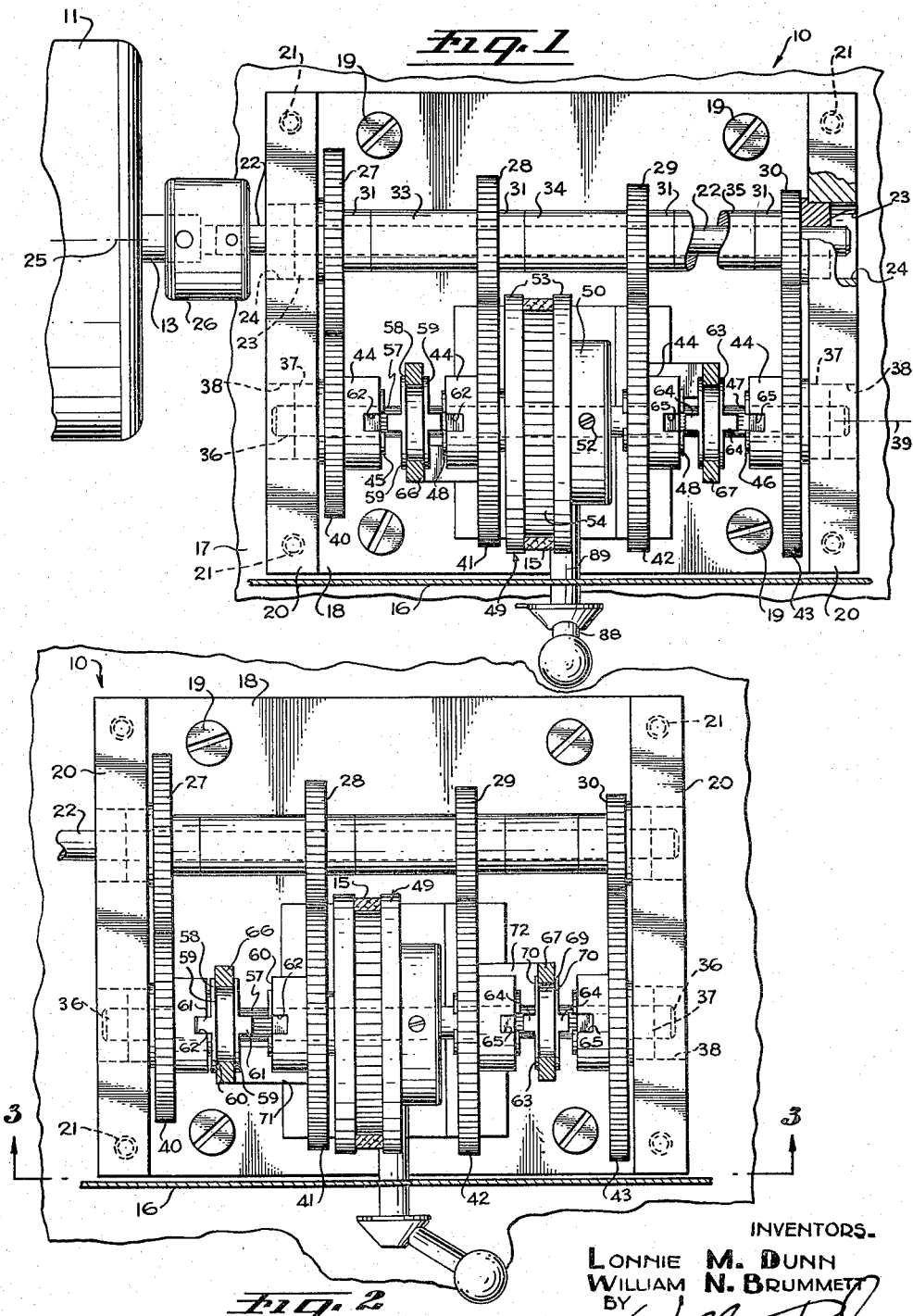
INVENTORS.
LONNIE M. DUNN
WILLIAM N. BRUMMETT
BY
William P. Green
ATTORNEY Nov. 29, 1960    L. M. DUNN ET AL    2,961,885
MULTIPLE SPEED TRANSMISSION
Filed July 6, 1959    2 Sheets-Sheet 2
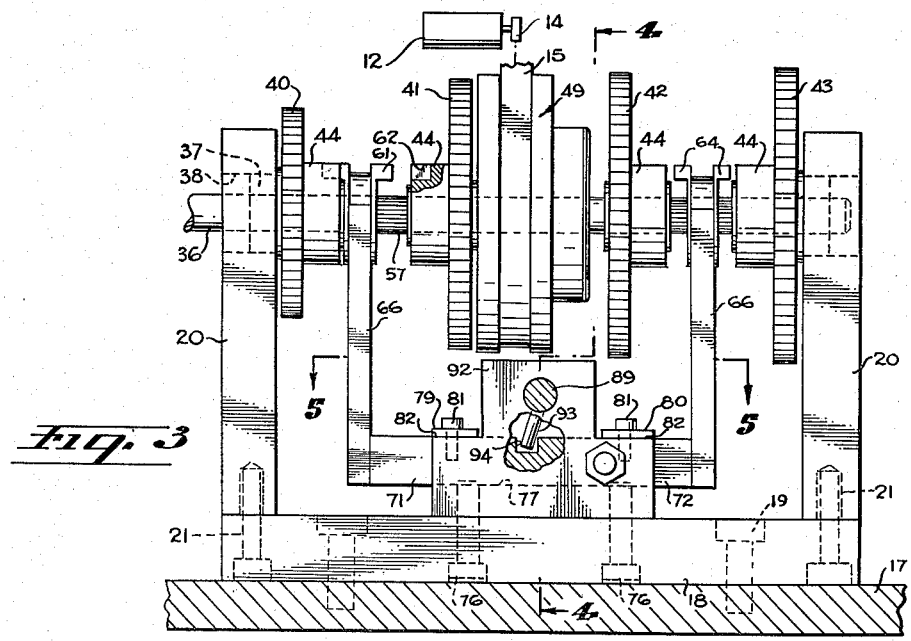
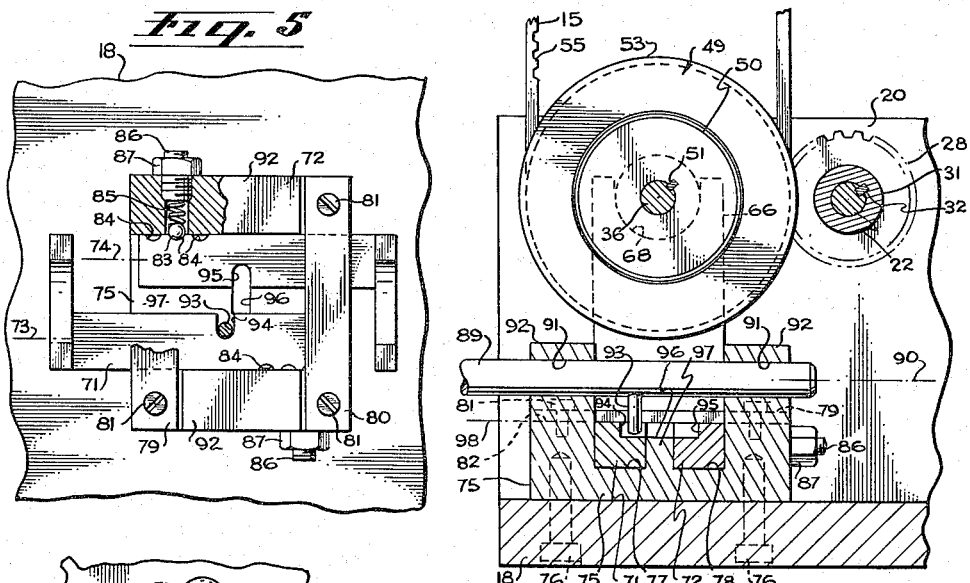
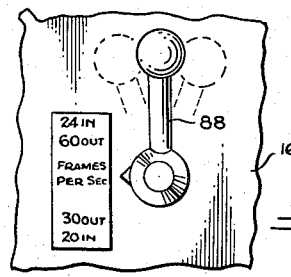
INVENTORS.
LONNIE M. DUNN
WILLIAM N. BRUMMETT
BY
William P. Green
ATTORNEY

United States Patent Office 2,961,885
Patented Nov. 29, 1960

2,961,885

MULTIPLE SPEED TRANSMISSION

Lonnie M. Dunn, 1460 Birchmont Drive, Anaheim, Calif., and William N. Brummett, 6900 Yarmouth Ave., Reseda, Calif.

Filed July 6, 1959, Ser. No. 825,192

3 Claims. (Cl. 74—375)

This invention relates to an improved transmission, of a type adapted to controllably vary the effective gear ratio between a drive unit and a driven unit. Though the transmission of the present invention is usable for any of various purposes, the device is in certain respects especially desirably for use as a synchronized multiple speed camera drive in X-ray motion picture equipment.

In copending application Serial No. 825,198 filed July 6, 1959 on "X-Ray Motion Picture Apparatus" by Irving Rehman, there is disclosed a unique device for making X-ray motion pictures, by photographing a fluoroscope screen with a motion picture camera. In order to maintain complete synchronism between the camera and the necessarily pulsating X-ray emissions produced by the X-ray apparatus in that invention, the Rehman invention utilizes a synchronous motor for driving the camera, with that motor being energized by the same alternating current power source which operates the X-ray radiation equipment. It is thus essential in the Rehman invention that the camera be at all times very accurately synchronized and interlocked with the motor by which it is driven, so that the synchronization of the camera and X-ray emission equipment can not possibly be lost.

In order to allow the X-ray motion picture equipment to take motion pictures at different speeds, that is, different numbers of frames per second, it is necessary to change the geared relationship between the drive motor and the camera. However, it is also necessary that, in shifting from one speed to another, the proper synchronized and interlocked relationship is maintained between the motor and camera, so that in all speeds, the camera and X-ray emission equipment are accurately timed and properly in phase with one another. A major object of the present invention is to provide an improved type of multiple speed transmission, which will serve as a speed changing transmission for the above discussed X-ray motion picture use, and which will very effectively and positively maintain the desired synchronized and interlocked relation between the motor and camera in all of the different speeds of the transmission. Preferably, the device of the present invention is designed to allow for four different camera speeds, specifically sixty frames per second, thirty frames per second, twenty-four frames per second and twenty frames per second.

In order to achieve this result, I utilize for each of the different speeds two meshing gears, which are associated with a drive shaft and a driven shaft respectively. One of these gears is connected to its associated shaft for rotation therewith, while the other gear is in one condition of the apparatus free for rotation relative to its shaft. A clutch element is provided on that last mentioned shaft, with the clutch element being keyed for rotation with the shaft, and being movable axially between a driving position in which it interfits in driving relation with the coacting gear, and a released position in which the connection between clutch element and gear is broken. The clutch element and the gear desirably are adapted to interfit in driving relation in only one relative rotary position, so that the proper synchronized and interlocked relation between the two shafts is always assured when the clutch element is in its engaged position.

For each of the different speeds of the apparatus, there are provided two meshing gears of the above discussed type, with one of the gears having a clutch element for releasably connecting it in driving relation to the associated shaft. A single one of these clutch elements may, in two different positions, interengage with two different gears carried by the same shaft, to thus reduce the number of clutch elements that are required. In a preferred form of the invention, there are two clutch elements, each received between and selectively coacting with two associated gears. A single actuating member may be adapted to shift both of these clutch elements between its different positions, with the actuating element itself being shiftable between a first position for actuating one of the clutch elements, and a second position for actuating the other clutch element.

The above and other features and objects of the present invention will be better understood from the following detailed description of the typical embodiment illustrated in the accompanying drawings in which:

Fig. 1 is a plan view of a transmission constructed in accordance with the invention, and showing both of the two clutch elements in released or neutral positions;

Fig. 2 is a view similar to Fig. 1, but showing one of the clutch elements in an engaged position;

Fig. 3 is a section taken primarily on line 3—3 of Fig. 2;

Fig. 4 is a fragmentary vertical section taken on line 4—4 of Fig. 3;

Fig. 5 is a fragmentary horizontal section, partially broken away, taken on line 5—5 of Fig. 3; and Fig. 6 is a front view taken on line 6—6 of Fig. 1.

In the drawings I have shown at 10 a multiple speed transmission constructed in accordance with the invention, and which is typically utilized as the power drive between a motor 11 (see Fig. 1) and a motion picture camera which is represented diagrammatically at 12 in Fig. 3. This camera 12 may be utilized for taking motion pictures of the fluoroscopic screen of an X-ray unit which is energized by the same alternating current power source which operates motor 11. The motor 11 is desirably a synchronous motor, whose driven shaft 13 is always in a predetermined phase relationship with respect to the alternating current by which the motor is driven. Motor 11 may be either a direct current energized synchronous motor or a permanent magnet type of synchronous motor. The drive shaft of camera 12 is driven by a toothed pulley 14, which is driven by, and in accurately timed relation with, a toothed timer belt represented at 15, acting to maintain a proper timed relation between the transmission and the camera.

The motor, transmission, and camera may all be contained within a suitable housing, whose front wall is represented at 16 (see Figs. 1 and 2), and which contains a rigid stationary frame work represented fragmentarily at 17, to which the transmission, motor and camera are all mounted at fixed positions in any suitable manner. The transmission 10 includes a horizontal base member 18, which may be rigidly bolted to frame structure 17 by bolts represented at 19. At the opposite sides of this base member 18, the transmission unit includes two upstanding parallel side walls 20, typically secured by screws 21 to the base. As will appear, all of the various moving parts of the transmission are mounted to the rigid frame elements 18 and 20.

Toward the back side of the transmission, there is provided a horizontal shaft 22, which is journalled near its opposite ends in two bushings 23 contained within aligned bores 24 in the side members 20 of the transmission frame structure. These bushings 23 journal the shaft 22 for rotation about the main axis 25 of motor 11, with one end of the shaft being rigidly attached to motor drive shaft 13 by means of a conventional coupling element 26, acting to turn shaft 22 with motor shaft 13.

At four spaced locations between the two side members 20 of the transmission, shaft 22 carries four different size gears 27, 28, 29 and 30, each having a short reduced diameter hub portion 31, with the gears being positively keyed in fixed rotary positions relative to shaft 22 by virtue of individual keys 32 (see Fig. 4). The gears 27, 28, 29 and 30 are all maintained in properly spaced positions on shaft 22 by means of spacer tubes 33, 34 and 35 disposed about the shaft and between the gears. The two end gears 27 and 30 are retained against axially outward movement by abutting engagement with the two bushings 23 respectively. Thus, all of the gears are effectively retained in their illustrated positions, and are continuously driven in unison by motor 11.

The opposite side members 20 of the transmission frame structure also rotatably mount a second shaft 36, having opposite ends journalled within two bushings 37 contained within bores 38 in parts 20. Shaft 36 extends parallel to shaft 22, and is directly in front of that shaft, so that the axis 39 of shaft 36 preferably extends horizontally, and lies in the same horizontal plane as axis 25 of the motor and rear shaft 22. About shaft 36, there are mounted four different size gears 40, 41, 42 and 43, which continuously mesh with and are continuously driven by the four gears 27, 28, 29 and 30 respectively. These gears 40 through 43 have integral hub portions 44, with each of the gears 40 through 43 being rotatable about and relative to shaft 36, but being effectively retained against axial movement relative to the shaft. For this purpose, the shaft 36 has externally cylindrical portions at the locations of the various gears 40 through 43 and their integral hub portions 44, and each of the gears is internally cylindrical and of a diameter corresponding to the engaged portion of the shaft, to rotatably mount the gears on the shaft.

Each of the two end gears 40 and 43 is retained at one side against axial movement by engagement with one of the bushings 37. At its opposite side, each of these end gears is retained against axial movement by abutment of its hub portion 44 against a snap ring or split ring 45 or 46, which is partially received within a suitable groove 47 in the shaft, to retain the ring in fixed position. The two gears 41 and 42 may be similarly retained against axial movement by additional snap rings as represented at 48, or by any other suitable retaining means capable of holding the gears against axial movement, while allowing their free rotation relative to shaft 36.

Axially between the two center gears 41 and 42, shaft 36 carries a power take-off pulley 49, typically having an axially projecting hub portion 50, and which is rigidly secured in fixed position relative to the shaft 36, as by means of a key 51 (see Fig. 4) and a set-screw 52. Between its two flanges 53, the pulley 49 has a toothed surface 54, for engaging the toothed surface 55 of timing belt 15, so that the belt 15 is always timed effectively with respect to pulley 49. The previously mentioned pulley 14 which drives the shaft of camera 12 is of the same construction as that represented at 49 in the transmission structure.

Between the two gears 40 and 41, shaft 36 has an externally splined or non-circular portion 57, about which there is mounted a clutch element 58, which is internally splined in correspondence with the outer surface 57 of the shaft, so that clutch element 58 is keyed to always turn with the shaft, in fixed rotary position relative thereto, but is free for axial movement along portion 57 of the shaft. The opposite sides of clutch element 58 define two parallel surfaces 59, extending directly transversely of the axis 39 of shaft 36, and which are adapted to move into closely proximate parallel relationship with respect to transverse end surfaces 60 on the hub portions 44 of gears 40 and 41. Each of the transverse surfaces 59 on part 58 is interrupted at only one location, at which the part 58 forms a clutching lug 61, which is adapted to be received within a correspondingly shaped notch or recess 62 formed in the hub 44 of the associated gear 40 or 41. As will be understood, when either of the lugs 61 is received within the coacting notch 62, this interfitting relationship between the parts 58 and 44 forms a positive drive connection therebetween, by virtue of which the gear 40 or 41 acts through element 58 to positively drive shaft 36. The lugs 61 are of course offset radially from shaft 36, and may have the rectangular cross-sectional configuration represented in Fig. 1.

Fig. 1 shows clutch element 58 in a neutral position, in which it is disengaged from both of the associated gears 40 and 41, so that both of these gears are driven by gears 27 and 28 without transmission of their driving power to shaft 36. Fig. 2 shows the clutch element shifted to the left, to engage with gear 40, and transmit rotation therefrom to shaft 36. In order to engage with the second gear 41, the clutch element is actuated to the right from its Fig. 1 position, so that the rightwardly projecting lug fits into the notch 62 of gear 41.

Between the gears 42 and 43, there is provided a second clutch element 63, which may be substantially identical with clutch element 58, and whose oppositely projecting lugs 64 are receivable selectively within notches 65 in the two gears 42 and 43. Thus, this second clutch element 63 is capable of driving shaft 36 from either the gear 42 or gear 43.

Clutch elements 58 and 63 are actuated axially between their different settings by means of two separate yokes 66 and 67, lying essentially in two spaced parallel planes which extend vertically and parallel to the opposite sides 20 of the transmission frame structure. As seen in Fig. 4, each of the yokes contains a semi-circular upwardly opening recess 68, within which a cylindrical surface 69 of the associated yoke is rotatably received, with the clutch elements having flanges 70 engaging opposite sides of yokes 66 and 67 to retain the clutch elements in fixed axial position relative to the controlling yokes, while still permitting rotation of the clutch elements relative to the yokes.

At their lower ends, yokes 66 and 67 are carried and rigidly attached to two horizontally extending elements 71 and 72, which have the rectangular cross-sectional configuration represented in Fig. 4, and which extend horizontally and parallel to one another, and are guided for individual sliding movement along two axes 73 and 74 (see Fig. 5) which extend parallel to the previously mentioned axes 25 and 39. The parts 71 and 72 are guided for their sliding movement by a rigid guide block 75, which is screwed to base 18 at 76 (see Fig. 4), and which contains two upwardly opening recesses 77 and 78, extending in the direction of axes 73 and 74, and having the same cross-sectional configurations as elements 71 and 72, to guide these elements for their sliding movement. The parts 71 and 72 are retained within recesses 77 and 78 by means of two upper horizontally extending straps 79 and 80, which are connected at their front and rear ends by screws 81 to upper surfaces 82 of block 75. The undersurfaces of retaining straps 79 and 80 lie in substantially the same plane as the upper surfaces of elements 71 and 72, so that elements 71 and 72 are effectively confined within recesses 77 and 78.

Each of the elements 71 and 72 and its associated yoke 66 or 67 is adapted to be yieldingly retained in any of its three positions, that is, its neutral or central position and either of the two driving positions of the associated clutch element. This holding action is effected by means of two spring pressed ball detents 83 (see Fig. 5), which are carried by block 75 and are receivable selectively within any of three detent notches 84 formed in part 71 or 72. The ball detents and their springs 85 are retained in part 75 by means of threaded retaining studs 86, secured in position by nuts 87.

For shifting elements 71 and 72 and the carried yokes, I provide a swinging actuating handle 88 which is accessible to an operator at the outside of the front wall 16 of the housing, and which is attached to a horizontally extending shaft 88, projecting from front to rear and transversely of shafts 22 and 36. This control shaft 89 is journalled for limited rotary movement about its horizontal axis 90 by reception within aligned bores 91 in two upwardly projecting front and rear portions 92 of block 75. Between these two portions 92 of the block, shaft 89 rigidly carries a downwardly projecting finger 93, which is adapted to be received within either of two opposed notches 94 and 95 formed in parts 71 and 72 (see Figs. 3, 4 and 5). When finger 93 is received within notch 94 in element 71, as seen in Fig. 5, then swinging movement of handle 88 and shaft 89 about axis 90 will serve to actuate part 71 and the associated clutch element 58 between its three different positions. Similarly, if finger 93 is received within notch 95 in part 72, then swinging or rotary movement of handle 88 will serve to actuate clutch element 63. The shaft is free for axial movement between the full line position of Fig. 4 and the rearmost broken line position of that figure, to move finger 93 between notches 94 and 95. However, such axial shifting of handle 88 and shaft 89 can be effected in only the central or neutral position of the handle, in which finger 93 is positioned to pass rearwardly or forwardly through a central notch 96 formed in the upper surface of a portion 97 of block 75, which portion of the block projects upwardly between and separates the two elements 71 and 72. Except at the location of this notch 96, divider portion 97 of block 75 projects upwardly to the plane 98 of Fig. 4, to thus prevent front to rear shifting of finger 93 except by way of notch 96.

The different sets of gears 27 and 40, 28 and 41, 29 and 42, and 30 and 43 are so designed as to give four different desired gear ratios between the speed of rotation of drive shaft 22 and driven shaft 36, and therefore to give four different gear ratios between the speed of motor 11 and the driven camera 12. In the preferred arrangement for use in X-ray motion picture equipment, the different gear ratios are as follows:

(1) Gears 27 and 40, 1 to 1 speed ratio for driving camera 12 to take pictures at 60 frames per second.

(2) Gears 28 and 41, 2 to 1 gear ratio, 30 frames per second.

(3) Gears 29 and 42, 5 to 2 ratio, 24 frames per second.

(4) Gears 30 and 43, 3 to 1 ratio, 20 frames per second.

The front wall 16 of the housing for the apparatus may carry markings indicating the different settings of actuating handle 88. Typical markings for this purpose are represented in Fig. 6, in which handle 88 is represented in full lines in its neutral position, and is represented in broken lines in the two actuated positions to which it may be swung.

To now describe the manner of operation of the illustrated apparatus, assume that the transmission is connected to motor 11 and camera 12 as shown, and that both of the clutch elements 58 and 63 are initially in their Fig. 1 neutral positions, with handle 88 therefore in its Fig. 6 full line neutral position. If it is now desired to first drive camera 12 at a speed of 60 frames per second, handle 88 is pulled outwardly or forwardly to a position in which finger 93 is received within notch 94 as seen in Figs. 4 and 5, and the handle 88 is then swung to the right to shift clutch element 58 to its Fig. 2 position, so that gear 40 will thereafter drive clutch element 58, and through it drive shaft 36, pulley 49, belt 15, pulley 14, and camera 12. The clutch element may be shifted before motor 11 is energized if lug 61 and recess 62 are in proper alignment, or the shifting may be effected after the motor is energized if necessary in order to bring these elements into alignment. If it is subsequently desired to shift to a speed of 30 frames per second, this is effected by merely swinging handle 88 to the left, to the left hand broken line position of Fig. 6, with the handle remaining in its forwardmost position. When conditions arise under which it is desirable to utilize the speeds of gears 42 or 43, the operator merely turns handle 88 to its neutral position shown in full lines in Fig. 6, then pushes the handle inwardly to cause finger 93 to shift through notch 96 and into rear notch 95, following which the handle may be swung in either direction to actuate clutch element 63 into engagement with either of its associated gears 42 or 43.

We claim:

1. A variable speed transmission comprising a drive shaft and a driven shaft mounted to turn about essentially parallel axes, a plurality of first gears carried by and mounted to turn with one of said shafts, a plurality of second gears mounted about the other shaft for rotation relative thereto and continuously meshing with said first gears respectively in power transmitting relation, a pair of clutch elements disposed about said other shaft and keyed thereto for rotation therewith but free for movement axially of the shaft between driving and released positions, interfitting means on each clutch element and an associated one of said second gears adapted to transmit power therebetween in said driving position of the clutch element but not in said released position, a pair of separate shifting parts for moving said clutch elements respectively between active and released positions and mounted for movement in a common direction, a manually operated actuating member, an actuating shaft movable by said actuating member both rotatively about a third axis and axially thereof, said third axis extending generally transversely of said first two axes, and means on said actuating shaft adapted to interfit with said shifting parts and actuate them in response to rotary movement of the shaft, said last mentioned means being constructed to interfit with and actuate one of said shifting parts in one axial position of the actuating shaft, and to interfit with and actuate the other shifting part in another axial position of the actuating shaft.

2. A variable speed transmission comprising a drive shaft and a driven shaft mounted to turn about essentially parallel axes, a plurality of first gears carried by and mounted to turn with one of said shafts, a plurality of second gears mounted about the other shaft by rotation relative thereto and continuously meshing with said first gears respectively in power transmitting relation, a pair of clutch elements disposed about said other shaft and keyed thereto for rotation therewith but free for movement axially of the shaft between driving and released positions, interfitting means on each clutch element and an associated one of said second gears adapted to transmit power therebetween in said driving position of the clutch element but not in said released position, a pair of separate shifting parts for moving said clutch elements respectively between active and released positions and mounted for movement in a common direction, a manually operated actuating member, an actuating shaft movable by said actuating member both rotatively about a third axis and axially thereof, said third axis extending generally transversely of said first two axes, and means on said actuating shaft adapted to interfit with said shifting parts and actuate them in response to rotary movement of the shaft, said last mentioned means being constructed to interfit with and actuate one of said shifting parts in one axial position of the actuating shaft, and to interfit with and actuate the other shifting part in another axial position of the actuating shaft, each of said clutch elements being received axially between and being selectively engageable with either of two spaced ones of said second gears, and each clutch element being constructed to interfit in driving relation with each of the associated second gears in only one relative rotary position of the interfitting parts.

3. A variable speed transmission as recited in claim 2, in which said means on the shaft include a finger projecting from the shaft and selectively receivable in interfitting actuating relation within either of two notches formed in the shifting parts respectively, said finger being movable between said two notches in response to axial movement of the shaft, and there being a wall between said two shifting parts blocking movement of the finger between said notches except when the finger is in a predetermined neutral position, said wall having a notch for passing said finger between said two first mentioned notches when in said neutral position.

References Cited in the file of this patent

UNITED STATES PATENTS

| | | |
|---|---|---|
| 1,348,160 | Downie | Aug. 3, 1920 |
| 1,735,187 | Storle | Nov. 12, 1929 |
| 2,107,417 | Kaptuller | Feb. 8, 1938 |
| 2,465,885 | Koster et al. | Mar. 29, 1949 |
| 2,694,943 | Brumbaugh | Nov. 23, 1954 |
| 2,727,602 | Saives | Dec. 20, 1955 |